(12) United States Patent
Smith et al.

(10) Patent No.: US 7,364,364 B2
(45) Date of Patent: Apr. 29, 2008

(54) CARTRIDGE BEARING

(75) Inventors: Jennifer A. Smith, Torrington, CT (US); Donald H. Hastie, Jr., Southington, CT (US)

(73) Assignee: Timken US Corporation, Torrington, CT (US)

( * ) Notice: Subject to any disclaimer, the term of this patent is extended or adjusted under 35 U.S.C. 154(b) by 10 days.

(21) Appl. No.: 10/946,993

(22) Filed: Sep. 21, 2004

(65) Prior Publication Data

US 2005/0163409 A1    Jul. 28, 2005

Related U.S. Application Data

(60) Provisional application No. 60/505,148, filed on Sep. 23, 2003.

(51) Int. Cl.
*F16C 19/49*    (2006.01)

(52) U.S. Cl. .................................... 384/494

(58) Field of Classification Search ............... 384/494, 384/484, 486, 513, 548, 454, 477, 482; 474/74
See application file for complete search history.

(56) References Cited

U.S. PATENT DOCUMENTS

| | | | | |
|---|---|---|---|---|
| 2,040,489 | A | * | 5/1936 | Large ..................... 384/454 |
| 2,909,397 | A | * | 10/1959 | Brown .................... 384/494 |
| 3,140,129 | A | * | 7/1964 | Koss ....................... 384/477 |
| 3,424,507 | A | | 1/1969 | Rollins et al. |
| 3,700,296 | A | * | 10/1972 | Bugmann ................ 384/484 |
| 3,923,350 | A | | 12/1975 | Berry |
| 4,248,487 | A | * | 2/1981 | Asberg .................... 384/494 |
| 4,391,476 | A | * | 7/1983 | Negele et al. ........... 384/494 |
| 4,715,780 | A | | 12/1987 | Kan |
| 5,044,782 | A | * | 9/1991 | Jankowski ............... 384/482 |
| 6,588,560 | B1 | * | 7/2003 | Fujiwara ................. 192/45 |
| 7,004,861 | B2 | * | 2/2006 | Fujiwara ................. 474/74 |

FOREIGN PATENT DOCUMENTS

| JP | 07208503 A | * | 8/1995 |
|---|---|---|---|
| JP | 11101228 A | * | 4/1999 |

\* cited by examiner

*Primary Examiner*—Marcus Charles
(74) *Attorney, Agent, or Firm*—Michael Best & Friedrich LLP

(57) ABSTRACT

A bearing assembly including an inner ring, an outer ring, a ball bearing assembly, a needle bearing assembly, and seals. The inner ring defines a ball raceway and a needle bearing raceway. The outer ring defines a ball raceway and a needle bearing raceway. A plurality of circumferentially arranged balls are received by said inner and outer ring ball raceways and a plurality of circumferentially arranged needle rollers are received by said inner and outer needle bearing raceways. The seals seal each end of the assembly.

20 Claims, 4 Drawing Sheets

CARTRIDGE BEARING

This application claims the benefit of U.S. Provisional Application No. 60/505,148 filed on Sep. 23, 2003.

BACKGROUND

The present invention relates to a bearing assembly for use with a shaft or spindle, for example, in a commercial lawnmower spindle assembly or a like device. More particularly, the present invention relates to a unitized bearing assembly.

Many shaft applications require a bearing assembly that provides both axial thrust and radial load bearing. Some applications have addressed such by providing two spaced apart rows of bearing elements, with at least one of the bearing elements being balls that are received in a groove in the shaft to provide axial support for the shaft. The second row of bearing elements has been provided as a separate unit that is assembled about the shaft and thereafter the two bearing assemblies unitized.

SUMMARY

The present invention provides a bearing assembly including at least one inner ring defining a ball raceway and a needle bearing raceway. An outer ring having first and second ends with a ball raceway and a needle bearing raceway defined therebetween is positioned about the inner ring. A plurality of circumferentially arranged balls are received by said inner and outer ring ball raceways and a plurality of circumferentially arranged needle rollers are received by said inner and outer needle bearing raceways. A seal is positioned in and retained by each end of the outer ring. Each seal includes a seal lip engaging the at least one inner ring.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
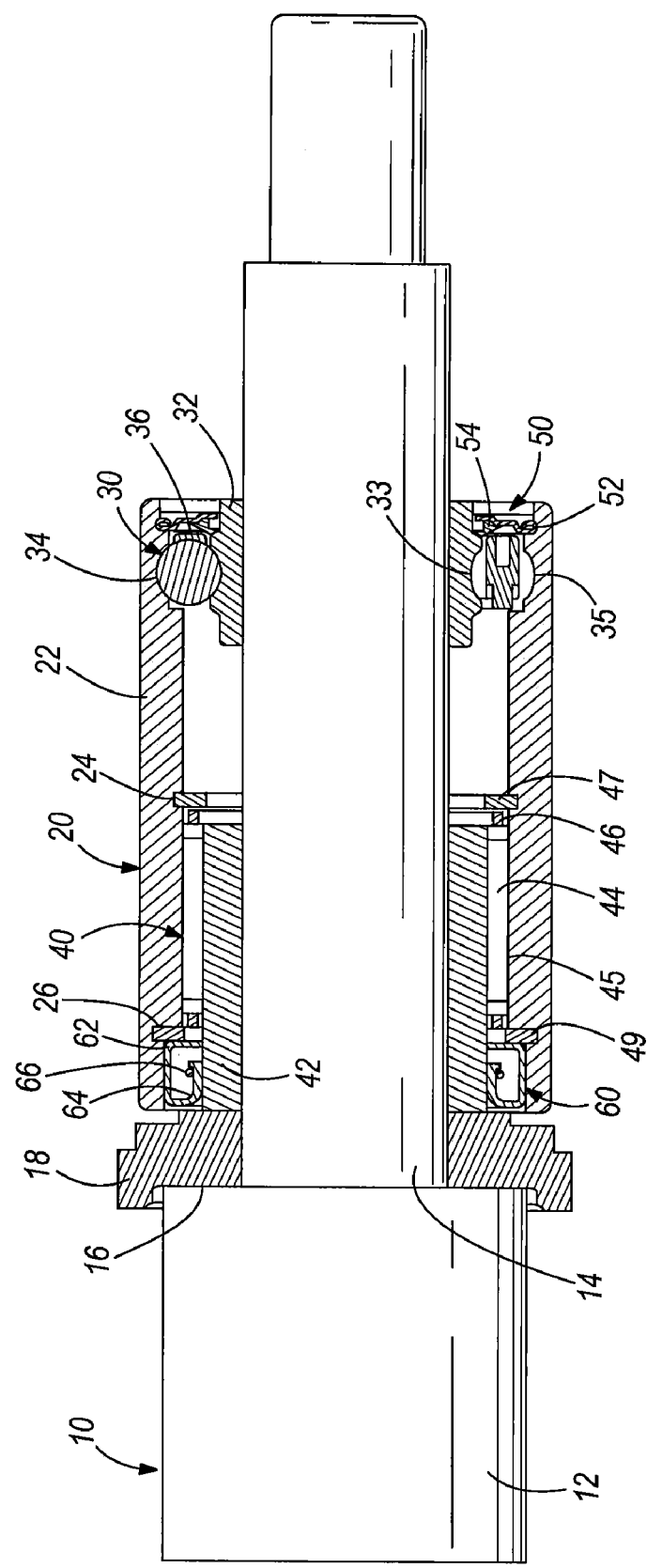
FIG. 1 is a side elevation view, in cross section, of a bearing assembly that is a first embodiment of the present invention positioned about an illustrative shaft.
Figure 2:
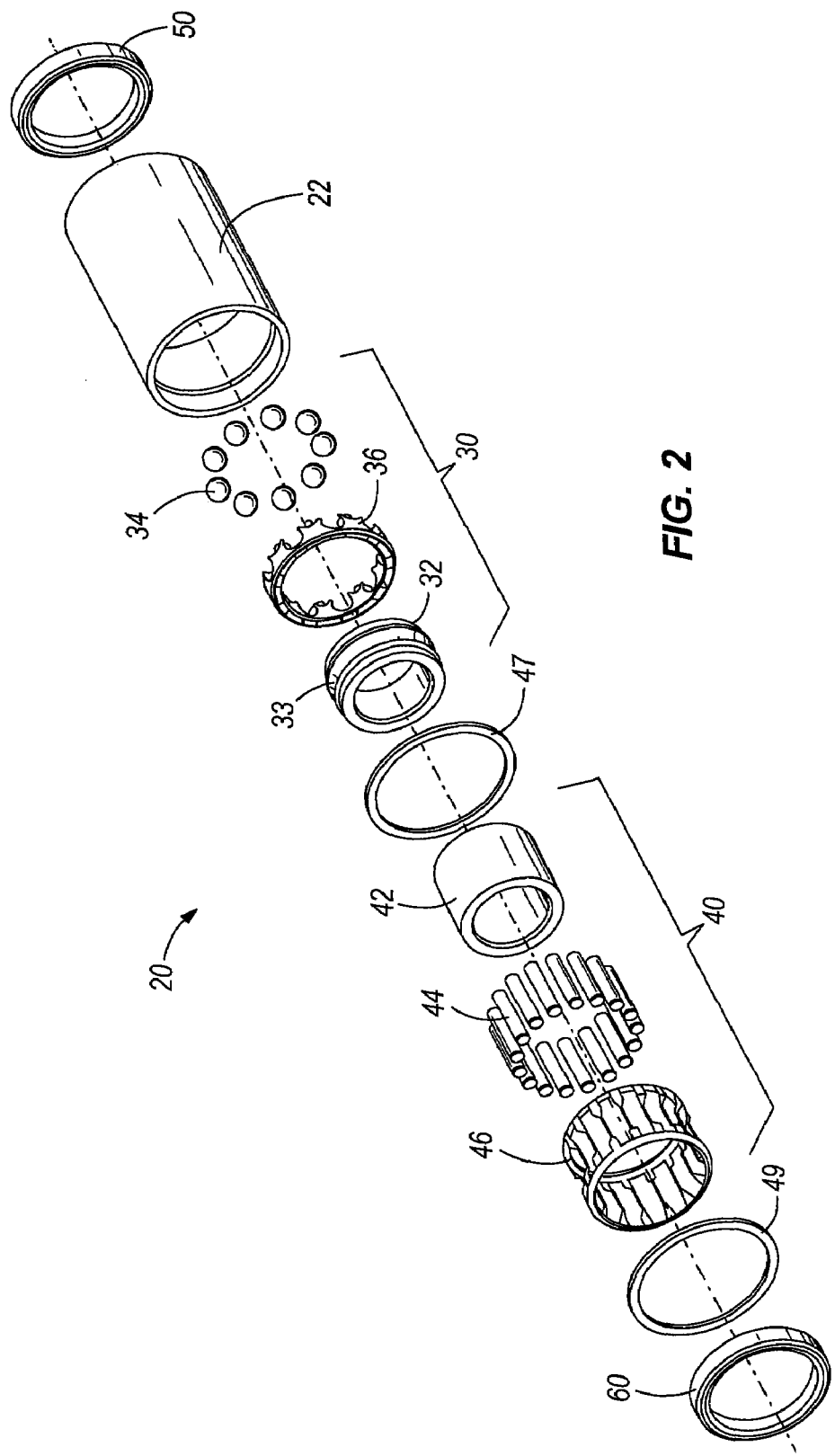
FIG. 2 is an exploded isometric view of the bearing assembly of FIG. 1.

Referring to FIGS. 1 and 2, a bearing assembly 20 that is a first embodiment of the present invention will be described. The bearing assembly 20 is shown positioned about an illustrative shaft 10. The shaft 10 is shown with a first portion 12 of a given diameter and a reduced diameter portion 14 with a shoulder 16 defined therebetween. A bushing 18 is positioned between the shoulder 16 and the bearing assembly 20. Other shaft configurations and mounting arrangements may also be utilized.

The bearing assembly 20 generally comprises an outer ring 22; a ball bearing assembly 30; a needle bearing assembly 40; and a pair of end seals 50 and 60. The outer ring 22 is defined by a tube that may be manufactured from various materials including metals and polymers. The outer ring 22 is configured for attachment or other engagement with a housing, for example, a lawn mower housing. The outer ring 22 is shown as having a cylindrical configuration, but may have other external configurations to facilitate such engagement. The inside surface of the outer ring 22 has a circumferential groove 35 to define an outer bearing surface for the ball bearing assembly 30. The inside surface of the outer ring 22 also has a cylindrical surface 45 to define an outer bearing surface for the needle bearing assembly 40.

The ball bearing assembly 30 includes an inner ring 32 and a plurality of balls 34. In the preferred embodiment, the balls 34 are retained in a cage 36 or the like. The inner ring 32 has an external circumferential groove 33 to defined an inner bearing surface for the balls 34. Referring to FIG. 1, the inner ring 32 is positioned within the outer ring 22 with the grooves 33 and 35 aligned and the balls 34 positioned therebetween. The balls 34 so positioned provide radial support and axial support between the inner ring 32 and the outer ring 22. The inner ring 32 is preferably interference fit about the shaft 10 such that axial support is provided between the outer ring 22 and the shaft 10. While an interference fit is preferred, the inner ring 32 may otherwise be interconnected with the shaft 10.

The needle bearing assembly 40 includes an inner ring 42 and a plurality of needle rollers 44. In the preferred embodiment, the needle rollers 44 are retained in a cage 46 or the like. The needle rollers 44 are positioned about the inner ring 42 and the assembly is positioned within the outer ring 22, aligned with the cylindrical surface 45. In the present embodiment, a pair of snap rings 47, 49 are received in grooves 24, 26 on the internal surface of the outer ring 22 to limit axial movement of the needle bearing assembly 40. The inner ring 42 has a cylindrical inner surface that is interference fit about the shaft 10. Again, while an interference fit is preferred, the inner ring 42 may otherwise be interconnected with the shaft 10. The needle bearing assembly 40 provides radial support for the shaft 10. The needle rollers 44 and the outer and inner rings 22, 42 are sized and manufactured from a desired material to meet the intended load requirement. In the lawn mower application, the components are generally manufactured to endure and dissipate impact loading, for example, when the mower blade hits a rock or the like.

To prevent ingress of unwanted contaminants, a seal 50, 60 is provide at each end of the bearing assembly 20. The seal 50 adjacent the ball bearing assembly 30 is shown having a spring type retainer 52 biased against the outer ring 22 and a polymer seal member 54 engaging the ball bearing inner ring 32. The seal 60 adjacent the needle bearing assembly 40 includes an outer cup 62 interference fit within the outer ring 22. A polymer seal member 64 extends from the cup 62 and engages the needle bearing inner ring 42. A support ring 66 or the like may be provided about the seal member 64 to increase the sealing force between the seal member 64 and the needle bearing inner ring 42. Other seal configurations may also be utilized.

As can be seen in FIG. 1, the ball bearing assembly 30, the needle bearing assembly and the seals 50, 60 are all retained in the outer ring 22 independent of the shaft 10. The bearing assembly 20 can be easily assembled into a pre-assembled component independent of the shaft 10. The shaft 10 does not require any special machining, hardening or other treatment. Instead, the shaft 10 can simply be positioned in to the bearing assembly 20. Such allows for easy assembly of the bearing assembly 20 and allows for easier field maintenance if required.

Figure 3:
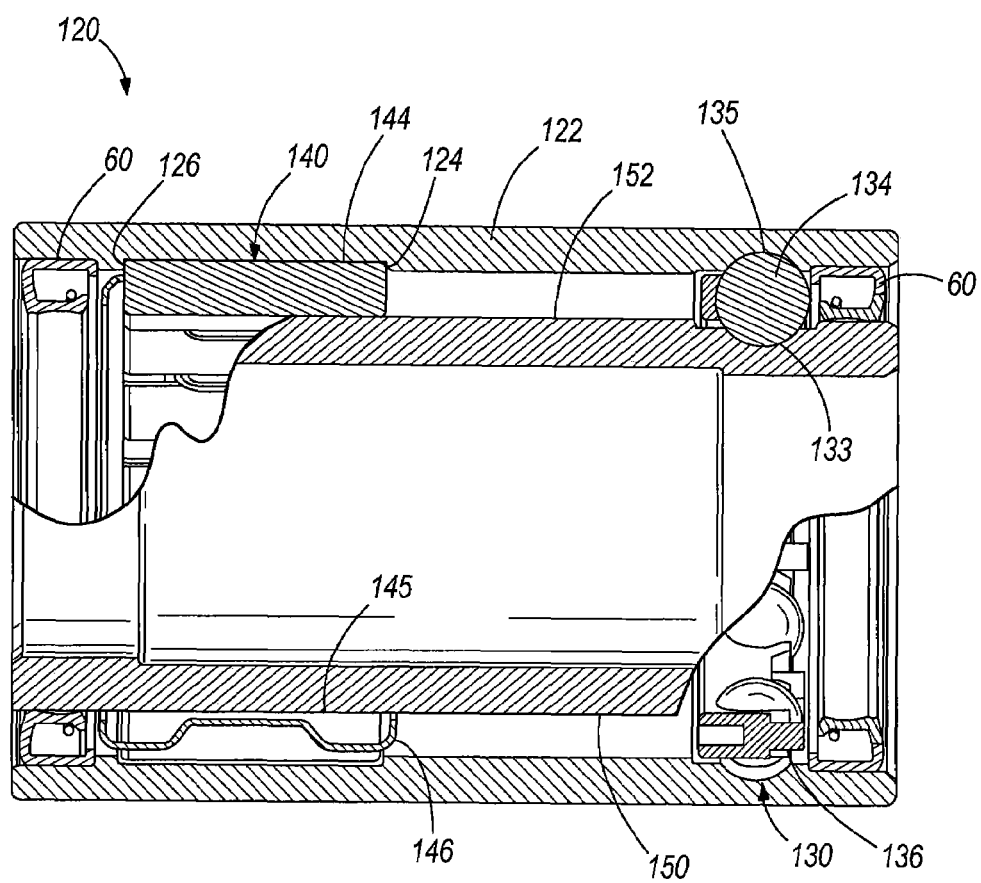
FIG. 3 is a side elevation view, in cross section, of a bearing assembly that is a second embodiment of the present invention.
Figure 4:
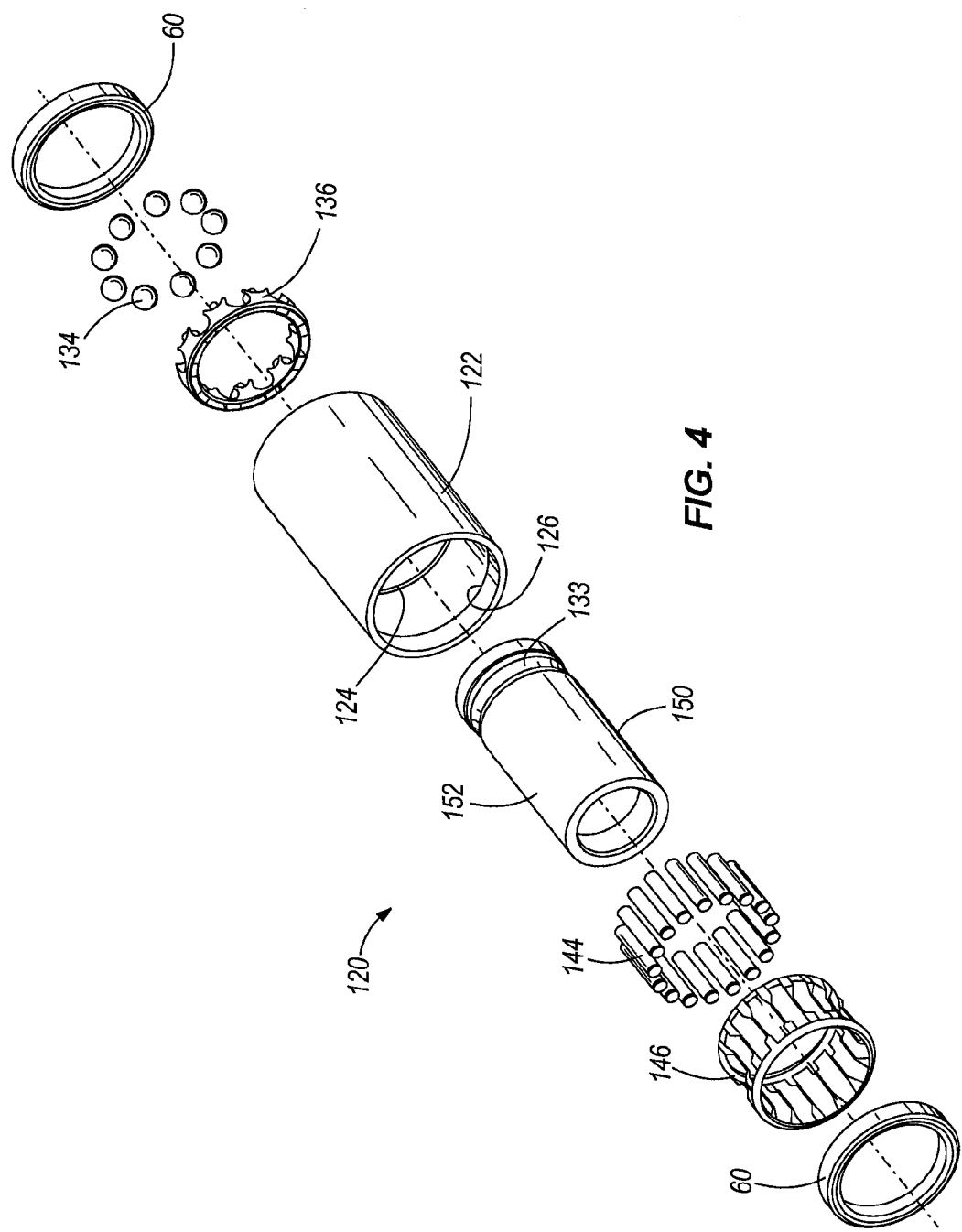
FIG. 4 is an exploded isometric view of the bearing assembly of FIG. 3.

FIGS. 3 and 4 show a bearing assembly 120 that is a second embodiment of the present invention. The bearing assembly 120 is similar to the first embodiment and includes an outer ring 122, a ball bearing assembly 130, a needle bearing assembly 140 and a pair of seals 60. The inside surface of the outer ring 122 again has a circumferential groove 135 to define an outer bearing surface for the ball bearing assembly 130. The inside surface of the outer ring 122 also has a cylindrical surface 145 to define an outer bearing surface for the needle bearing assembly 140. A pair of shoulders 124 and 126 are provided about the cylindrical surface 145 to define axial stops for the needle bearing assembly 140, thereby eliminating the snap rings of the previous embodiment. Also in distinction from the previous embodiment, the inner bearing surfaces are defined by a single inner ring 150 having a cylindrical bearing surface 152 providing a bearing surface for the needles 144 and a circumferential groove 133 providing an inner bearing surface for the balls 134. Receipt of the balls 134 in the opposed grooves 133 and 135 and of the needles 144 between the shoulders 124 and 126 unitizes the assembled bearing assembly 120. Again, seal members 60 or the like may be provided at each end to seal the bearing assembly 120.

What is claimed is:

1. A bearing assembly configured to be coupled to a shaft, the bearing assembly comprising:
    at least one inner ring defining a ball raceway and a needle bearing raceway, the at least one inner ring configured to receive the shaft;
    an outer ring having first and second ends with a ball raceway and a needle bearing raceway defined therebetween;
    wherein the outer ring ball raceway is defined by a circumferential groove and the outer ring needle bearing raceway is defined by a cylindrical surface;
    a plurality of circumferentially arranged balls received by said inner and outer ring ball raceways;
    a plurality of circumferentially arranged needle rollers received by said inner and outer ring needle bearing raceways; and
    a seal positioned in and retained by each end of the outer ring; each seal including a seal lip engaging the at least one inner ring;
    wherein the at least one inner ring includes a first inner ring having a circumferential groove aligned with the outer ring circumferential groove and a second inner ring having a cylindrical surface aligned with the outer ring cylindrical surface.

2. The bearing assembly of claim 1 wherein the plurality of balls are retained in a cage.

3. The bearing assembly of claim 1 wherein the plurality of needles are retained in a cage.

4. The bearing assembly of claim 1 wherein the first inner ring is configured for engagement with the shaft at a first location and the second inner ring is configured for engagement with the shaft at a second, different location.

5. The bearing assembly of claim 4 wherein the first and second inner rings are each interference fit about the shaft.

6. The bearing assembly of claim 1 wherein the outer ring is configured to receive a snap ring on opposed axial sides of the outer ring cylindrical surface to limit axial movement of the needle rollers.

7. The bearing assembly of claim 1 wherein the outer ring is configured for engagement with a housing.

8. The bearing assembly of claim 1 wherein the outer ring is manufactured from a metal.

9. The bearing assembly of claim 1 wherein the outer ring is manufactured from a polymer.

10. A bearing assembly configured to be coupled to a shaft, the bearing assembly comprising:
    at least one inner ring defining a ball raceway and a needle bearing raceway, the at least one inner ring configured to receive the shaft;
    an outer ring having first and second ends with a ball raceway and a needle bearing raceway defined therebetween;
    a plurality of circumferentially arranged balls received by said inner and outer ring ball raceways; and
    a plurality of circumferentially arranged needle rollers received by said inner and outer ring needle bearing raceways;
    wherein the outer ring ball raceway is defined by a circumferential groove and the outer ring needle bearing raceway is defined by a cylindrical surface; and
    wherein the at least one inner ring includes a first inner ring having a circumferential groove aligned with the outer ring circumferential groove and a second inner ring having a cylindrical surface aligned with the outer ring cylindrical surface.

11. The bearing assembly of claim 10 further comprising a seal positioned in and retained by each end of the outer ring; each seal including a seal lip engaging a respective one of the first inner ring and the second inner ring.

12. The bearing assembly of claim 10 wherein the plurality of balls are retained in a cage.

13. The bearing assembly of claim 10 wherein the plurality of needles are retained in a cage.

14. The bearing assembly of claim 10 wherein the first inner ring is configured for engagement with the shaft at a first location and the second inner ring is configured for engagement with the shaft at a second, different location.

15. The bearing assembly of claim 14 wherein the first and second inner rings are each interference fit about the shaft.

16. The bearing assembly of claim 10 wherein the outer ring is configured for engagement with a housing.

17. The bearing assembly of claim 10 wherein the outer ring is manufactured from a metal.

18. The bearing assembly of claim 10 wherein the outer ring is manufactured from a polymer.

19. A bearing assembly comprising:
    at least one inner ring defining a ball raceway and a needle bearing raceway;
    an outer ring having first and second ends with a ball raceway and a needle bearing raceway defined therebetween;
    a plurality of circumferentially arranged balls received by said inner and outer ring ball raceways; and
    a plurality of circumferentially arranged needle rollers received by said inner and outer ring needle bearing raceways;

wherein the outer ring ball raceway is defined by a circumferential groove and the outer ring needle bearing raceway is defined by a cylindrical surface; and wherein the outer ring is configured to receive a snap ring on opposed axial sides of the outer ring cylindrical surface to limit axial movement of the needle rollers.

20. A bearing assembly comprising:

at least one inner ring defining a ball raceway and a needle bearing raceway;

an outer ring having first and second ends with a ball raceway and a needle bearing raceway defined therebetween;

a plurality of circumferentially arranged balls received by said inner and outer ring ball raceways; and a plurality of circumferentially arranged needle rollers received by said inner and outer ring needle bearing raceways;

wherein the outer ring ball raceway is defined by a circumferential groove and the outer ring needle bearing raceway is defined by a cylindrical surface;

wherein the at least one inner ring includes a first inner ring having a circumferential groove aligned with the outer ring circumferential groove and a second inner ring having a cylindrical surface aligned with the outer ring cylindrical surface;

wherein the first inner ring is configured for engagement with a shaft at a first location and the second inner ring is configured for engagement with the shaft at a second, different location; and wherein the first and second inner rings are each interference fit about the shaft.

* * * * *